United States Patent Office 3,793,298
Patented Feb. 19, 1974

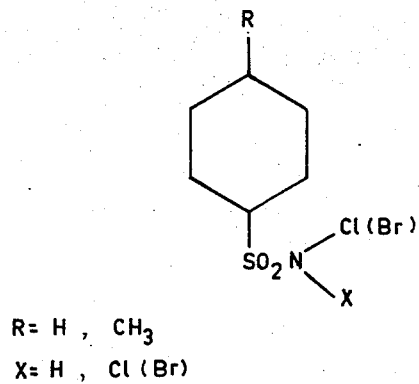
R= H , CH$_3$
X= H , Cl(Br)

3,793,298
METHOD FOR HALOGENIZING SURFACES OF SYNTHETIC AND/OR NATURAL RUBBER MATERIAL
Josephus Sychbertus Adrianus Langerwerf, Waalwijk, Netherlands, assignor to Nederlandse Organisatie voor Toegepast-Natuurwetenschappelijk Onderzoek ten behoeve van Nijverheid, Handel en Verkeer, The Hague, Netherlands
Filed May 11, 1972, Ser. No. 252,228
Claims priority, application Netherlands, May 28, 1971, 7107444
Int. Cl. C08d 5/04
U.S. Cl. 260—96 HA
9 Claims

ABSTRACT OF THE DISCLOSURE

It is known to halogenize surfaces of synthetic and/or natural rubber material to make these surfaces better gluable to rubber or other materials. As a halogen donor an acidified solution of a N-halogen sulphonamide is used according to this invention.

The invention relates to a method for halogenizing surfaces of synthetic and/or natural material in order to make these surfaces better gluable to rubber or other materials.

Such methods are known in the art. For instance, the rubber material is dipped in acidified bleaching lye for a few minutes. For a number of rubbers this does not yield reliable results. The use of solution of 2–4 percent of chlorine gas in carbon tetrachloride is inconvenient because of the poisonous and corrosiveness of the solution.

The method for halogenizing surfaces of synthetic and/or natural rubber material with a halogen donor in order to make these surfaces between gluable to rubber or other materials is, according to the invention, characterized in that an acidified solution is used of a N-halogen sulphonamide with the formula,

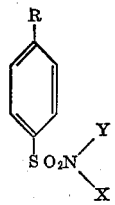

in which R is H or $CH_3$, X is H, Cl or Br and Y is Cl or Br.

Per se the N-monohalogen sulphonamides are not very stable but their solutions are stable for months if they do not contain acid and are not exposed to direct sunlight.

Suitable solvents are benzene, toluene, ethylacetate, carbon tetrachloride, tertiary butanol and in general solvents that are difficult to chlorinate.

Should, for instance, as a result of their method of preparation a solution of such N-halogen suphonamides be somewhat acid after all then the stability of the solution can be improved by adding an appropriate amount of a base; suitable for that purpose is, for instance, chloramine-T (sodium p-toluene-sulfochloramide) or, especially 0.01–30.0% of pyridine. Moreover, already when preparing the N-chlorosulphonamides one can see to it that they do not contain free acid.

Preparation of N-monochloro-p-toluene sulphonamide (A) To a suspension of 140 gms. of chloramine-T in 600 mls. of ethylacetate an equivalent amount (200 mls.) of dissolved acid was added. This solution of acid had been obtained by diluting one part by volume of 9 molar sulphuric acid with 6 parts by volume of tertiary butanol. As a stabilizing agent 1.5 gms. of chloramine-T were added. The coarse-grained sodium sulphate was filtered off and washed twice with 100 mls. of ethylacetate. Filtrate and washing liquid together form the chlorine donor component. If desired, the N-monochloro-p-toluene sulphonamide can also be isolated.

(B) One can proceed according to A, but with different solvents. For instance, one can suspend 140 gms. of chloramide-T in 800 mls. of a mixture of 20% of tertiary butanol and 80% of ethylacetate and add the sulphur acid as a 9 molar aqueous solution whereupon the sodium sulphate is washed with 2× 100 mls. of a mixture of 20% of tertiary butanol and 80% of ethylacetate.

Analogous methods of preparation hold for the bromine derivatives.

In order to obtain the halogenation action on rubber the solution should be acidified. It is possible but not practical to wet the rubber surface firstly with the solution of the N-halogen sulphonamide and then with an acid. It is much simpler to acidify the solution of the sulphonamide just before the application.

Some acids like sulphuric acid, nitric acid, hydrochloric acid, phosphoric acid and oxalic acid are very satisfactory and other acids such as pieric acid, trichloroacetic acid, monochloroacetic acid, formic acid and acetic acid are less satisfactory. It has been found possible to give a functional classification. If one will apply an acid not occurring in the list then one will have to check the usefulness empirically, which will be easy for the expert. The acids must be sufficiently strong, they must not react with the adhesive that will be applied later and they must be absorbed so highly to the rubber surface that the effect of halogenation disappears.

Consequently the halogenation agent consists of a N-halogen sulphonamide with the above formula, an acid and a solvent. The three components can form a mixture themselves. So, for instance, the solvent itself can be a mixture of solvents.

If, for the sake of the stability qualities of the solution of N-chloro-sulphonamide a stabilizing agent has been added, the latter naturally is also present in the halogenation agent.

In general it is true that the solvents must be able to evaporate easily, for there must not remain any solvent permanently present on the rubber surface.

Though the halogenation agent is preferably prepared shortly before application, the following is still to be noted about its stability. This stability is found to depend somewhat upon the solvent for the N-halogen-suphonamide. Thus a solvent of 30 percent, by weight of N-monochloro-p-toluene sulphonamide in a solvent mixture of tertiary butanol (30 parts by weight) and ethylacetate (70 parts by weight) containing 2 percent, by weight of oxalic acid was found to be stable for some days.

Thus it is possible for instance, to mix the halogenation agent with a solution of oxalic acid in tertiary butanol.

The concentration of halogen donor in the solvent in practice lies between 0.3 and 50 percentage by weight. Below it the degree of halogenation often is insufficient and above it deterioration of the adhesive layer can occur. A very adequate concentration lies between 5 and 20% and in practice one can easily operate with approximately 10%. Again the necessity of the absence of free acid is emphasized, if one wants to have reasonably stable solutions.

The acid can be added per se to the solution of N-halogen-sulphonamide, but in order to dissolve quickly it is desirable that the acid be introduced in the form of a solution. The solvent must be miscible with that of the halogen donor. In practice tertiary butanol is a suitable solvent. The concentration of tertiary butanol may be in the range of 0 and 50 percent, by weight calculated on the halogenating agent.

For most acids, in practice, the concentration of the acid in the ready halogenation agent lies between 0.01 and 2.0 molar. But in preparing the halogenation agent care has to be taken of the effect of the rest of the halogenation agent on the adhesive that is applied after application of the halogenation agent and evaporation of the solvents. In the case of sulphuric acid, for instance, the amount of $H_2SO_4$ in the ready halogenation agent must not be much higher than 0.2 molar, otherwise later on deterioration of the coat of adhesive will occur. The absolute amount of acid to be applied depends on the ratio of the amount of the solution of the chlorine donor to that of the acid. This ratio can be varied within ample limits. If one chooses a ratio of approximately 10 to 1, then from the above one knows within which limits one must maintain the amount of solution so as to obtain good results.

Weight limits of compounds that are useful in practice and calculated on the halogenation agent are in general:

N-halogen sulphonamide acid—1–40 percentage by weight
oxalic acid—0.01–0.3 molar
  or nitric acid—0.03–1.2 molar
  or hydrochloric acid (HCl)—0.03–1.2 molar
  or sulphuric acid—0.01–0.12 molar
  or phosphoric acid—0.01–0.12 molar and as a stabilizing agent, if necessary (for instance pyridine or chloramine-T), 0.1 to 1.0 percentage by weight.

No distinct difference in action between the halogen donors covered by the above formula has been found though there is the impression that the compounds with R is H and X is H work somewhat more smoothly.

The application of the halogenation agent onto the rubber surface can be effected in many ways such as by spreading, dipping, spraying, rubbing, and the like. The amount of halogenation agent applied can amount to from 10 to 100, for instance, from 40 to 60 mls. per m.$^2$ of rubber surface.

Already at ambient temperature the solvents evaporate quickly; immediately after this has taken place (mostly this takes about a couple of minutes) glueing can be effected. No significant differences have been found between rubber surfaces that had been glued 1 minute and those which had been glued 1 month after halogenating. Sometimes it may be of some advantage if soon after halogenation the rubber surface is covered with a small amount of swelling agent such as toluene, hexane, or ethylacetate. There are some cases in which this seems to be imperative. It was found, however, that in those cases just as good if not better results were obtained if the halogenation agent was rubbed into the rubber surface with somewhat more strength.

It is known in the art that halogenating rubber surfaces is conducive to the adhesion of all kinds of adhesives onto the rubber surface. In the shoe industry it is the custom to use adhesives based on polyurethanes or polychloropropene extensively. Besides, those based on polyurethanes react better to the halogenation of the surface.

The surfaces to which the rubber surface is glued may be very different, provided they themselves adhere to the adhesive. If one wants to adhere rubber to rubber then one will preferably halogenate both surfaces. Further, glueing with leather and synthetic leg materials, with paper, textile, plastics and the like is very well possible.

The rubber to be halogenated may be dense but also microcellular and even porous. The rubber may be vulcanized or unvulcanized; in practice mostly vulcanized rubber is used. The method is also suitable for thermoplastic rubber.

A method for evaluating the quality of the adhesion has been described in Technicuir, 2 (1968), page 59.

A very large number of various kinds and types of rubber was evaluated to determine the difference between the adhesion on treated and non-treated surfaces. In all cases the adhesion in case of the rubber surfaces that had been treated was substantially to very substantially better than the adhesion on non-treated and on roughened rubber surfaces. Many of these tests were carried out with a halogenation mixture of 10 parts by volume of a 10% solution of the N-halogen sulphonamide in ethylacetate, mixed with 1 part by volume of a 20% solution of oxalic acid in tertiary butanol. Instead of ethylacetate often a mixture 20:80 of tertiary butanol and ethylacetate, someimes also methylacetate instead of ethylacetate was used too. In some cases carbon tetrachloride was used. Significant differences have not been found.

It makes little difference whether the rubber had been roughened previously or not, for which reason in practice roughening is ommitted.

Neither does it make much difference whether the rubber has firstly been treated with the solution of the N-halogen sulphonamide and then with the solution of the acid, or whether both solutions are applied mixed with each other. In general, all kinds of variations do not matter very much as long as the rubber is brought into contact with the halogen donor and the acid.

Whether N-chloro- or N-bromosulphonamide is used does not make and difference in the result; the chlorine product is cheaper and, therefore, it was used in most tests.

I claim:

1. A method for halogenating surfaces of synthetic or natural rubber material with a halogen donor to make such surfaces better gluable to rubber or other materials, which comprises contacting such surfaces with an acidified solution of an N-halogen sulphonamide having the formula

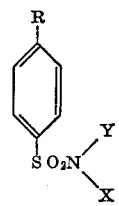

in which R is H or $CH_3$, X is H, Cl or Br and Y is Cl or Br, in an organic solvent in which said sulphonamide is soluble and which is substantially inert to the action of halogen and which solvent is volatile, said solution being acidified with an acid of a group consisting of oxalic acid, nitric acid, hydrochloric acid, sulphuric acid, phosphoric acid, picric acid, trichloroacetic acid, monochloroacetic acid, formic acid and acetic acid, and thereafter evaporating said solvent from said surface.

2. A method according to claim 1 wherein the acid is oxalic acid.

3. A method according to claim 1, wherein the solvent is a material of the group consisting of butanol, benzene, toluene, ethyl acetate, carbon tetrachloride or mixtures of them.

4. A method according to claim 1, wherein the solvent is tertiary butanol or a mixture of tertiary butanol with methyl acetate or ethyl acetate.

5. A method according to claim 1, wherein the solution also contains a stabilizing agent for the N-halogen sulphonamide, of the group consisting of pyridine and sodium p-toluene-sulfochloramide.

6. A method according to claim 1, wherein the Y of the sulphonamide is chlorine.

7. A method according to claim 1, wherein R is H and X is H.

8. A method according to claim 1, wherein the sulphonamide is the N-chloro-sulphonamide.

9. A method according to claim 1, wherein the sulphonamide is N-monochloro-p-toluene sulphonamide.

References Cited
UNITED STATES PATENTS

| | | | |
|---|---|---|---|
| 2,748,105 | 5/1956 | Becker et al. | 260—96 HA X |
| 2,829,070 | 1/1958 | Osborn | 260—96 HA X |
| 2,853,475 | 10/1958 | Murphy | 260—96 HA X |
| 3,009,904 | 11/1961 | Serniuk et al. | 260—96 HA X |

FOREIGN PATENTS 1,483,559  4/1967  France _____ 260—94.7

JAMES A. SEIDLECK, Primary Examiner

W. F. HAMROCK, Assistant Examiner

U.S. Cl. X.R.

260—85.1, 92.3, 94.7 HA, 770; 161—240, 153

PO-1050
(5/69)

UNITED STATES PATENT OFFICE
CERTIFICATE OF CORRECTION

Patent No. 3,793,298    Dated  February 19, 1974

Inventor(s)  Josephus S. A. Langerwerf

It is certified that error appears in the above-identified patent and that said Letters Patent are hereby corrected as shown below:

Page preceding Col. 1, change "J. Sychbertus et al" to --Josephus S. A. Langerwerf--.

Col. 1, line 33, "poisonous" should read --poisonousness--;
       line 37, "between gluable" should read --better glueable Col. 2, line 25, "pieric" should read --picric--;
       line 27, "It has been" should read --It has not been--;
       line 32, "they must be" should read --they must not be--

Col. 4, line 16, "ommitted" should read --omitted--.

References Cited:  "Murphy" should read --Murphey--.

Signed and sealed this 24th day of September 1974.

(SEAL)
Attest:

McCOY M. GIBSON JR.                C. MARSHALL DANN
Attesting Officer                  Commissioner of Patents